Nov. 25, 1924.

G. H. HEDGES 1,516,771

TIP-UP SEAT IN CINEMAS, THEATERS, AND THE LIKE

Filed May 18, 1922

INVENTOR:
George Hugh Hedges
BY Wm. Wallace White
ATT'Y.

Patented Nov. 25, 1924.

1,516,771

UNITED STATES PATENT OFFICE.

GEORGE HUGH HEDGES, OF BRISTOL, ENGLAND.

TIP-UP SEAT IN CINEMAS, THEATERS, AND THE LIKE.

Application filed May 18, 1922. Serial No. 561,806.

*To all whom it may concern:*

Be it known that I, GEORGE HUGH HEDGES, of 362 Fishponds Road, Bristol, England, a subject of the King of Great Britain and Ireland, have invented certain new and useful Improvements in or Relating to Tip-Up Seats in Cinemas, Theaters, and the like, of which the following is a specification.

This invention relates to seats in cinemas, theaters and the like, of the kind adapted to be tipped up and down about pivot pins as pivots projecting inwards from the side standards.

The object of this invention is to provide means which enable the seat to be readily put into place between the side standards, and to be withdrawn for repair or other purposes, without necessitating displacement or otherwise affecting the standards.

According to this invention, the seat is fitted at each side with a spring clip. These clips are screwed or otherwise fixed to the seat, and are located under the seat at a suitable distance between the front and back. Each clip comprises two flat limbs which are turned over so as to provide an eye at the bend. One of the limbs, that is to say the limb, which is undermost when the clip is in place under the seat, is preferably curved downwards at the inner end. The other limb is of greater length.

The clips are secured to the seat by screws which hold the upper limbs to the seat. The lower limbs have an aperture for access of a screw driver in turning the screw.

Referring to the drawings filed herewith;

Figure 1:
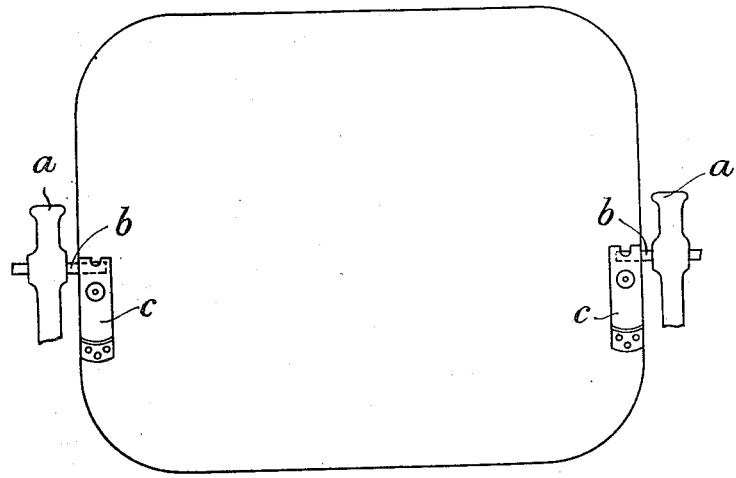
Fig. 1 is an elevation of a tipped seat in its raised position, showing one form of clip made in accordance with this invention for engaging the pivotal pins on the frame of the seat.
Figure 2:
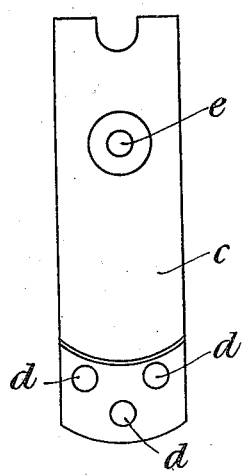
Fig. 2 is a detail plan, on an enlarged scale, of the clip shown in Fig. 1.
Figure 3:
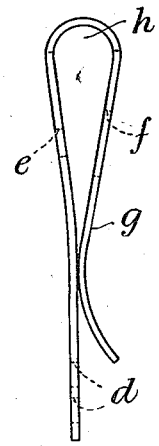
Fig. 3 is a corresponding side view thereof.
Figure 4:
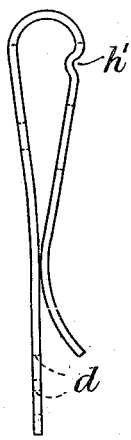
Fig. 4 is a side view of another form of clip.

$a, a$ is part of the framing of the seat; $b, b$ are pivotal pins secured to the framing; and $c, c$ are spring clips made in accordance with this invention. The clips $c, c$ are provided with holes $d, d$ and $e$ by which they can be secured to the underside of the seat. Each clip is also provided with a hole $f$ in the lower limb $g$ to allow access of the screw driver to drive a screw in the hole $e$. In the clip shown in Fig. 4, a traverse depression $h'$ is provided to prevent accidental displacement of the seat.

The form of clip may be varied without departing from the spirit of this invention.

In applying the seat to the standards, $a, a$, the seat carrying the clips $c, c$ is introduced from the front between the side standards, and when the clips arrive at the side pins $b, b$ of the standards, the side pins are received between the limbs of the clips $c, c$ and lodge in the bends $h, h$, and the seat is free to be tipped up and down about them as pivots.

The seat is readily withdrawable from the grasp of the clips and pulled out towards the front away from the standards.

What I claim, and desire to secure by Letters Patent, is:—

1. A tip-up seat comprising standards, pins on said standards, a seat removably associated with said standards, and spring clips on said seat turnable about said pins, said clips each consisting of a resilient strip bent upon itself with its free ends prisably abutting and its closed end embracing the complementary pin.

2. A tip-up seat comprising spaced standards, a removable seat complementary to said standards, pivot pins on said standards and spring clips on said seat, said clips each consisting of a resilient strip bent upon itself with its free ends prisably abutting and its closed end embracing and turnable about, and engaging and disengaging, said pivot pins.

3. A tip-up seat comprising spaced standards, a pin on each of said standards, a removable seat complementary to said standards, a spring clip secured to said seat adjacent said pin, said clip consisting of a resilient strip bent upon itself with its free ends prisably abutting and its closed end forming an eye complementary to said pivot pin and pivoting about same.

4. A tip-up seat comprising spaced standards, a pin on each of said standards, a removable seat complementary to said standards, a spring clip secured to said seat adjacent said pin, an eye in said clip pivoting about said pin, and a transverse depression in said clip extending into said eye.

5. A tip-up seat comprising spaced standards, a pivot pin on each of said standards, a removable seat complementary to said standards, and a member secured to said seat adjacent said pivot pin, said member consisting of a spring strip bent upon itself with its free ends prisably abutting and its closed end embracing and turnable on and about said pin.

6. A tip-up seat comprising a pair of spaced standards, a removable seat component interposed between said standards, pivot pins on said standards, members on said seat component adjacent said pivot pins, said members consisting of a resilient strip having upper and lower limbs enclosing a terminal eye complementary to said pivot pins, the limbs normally abutting at their free ends though prisable apart by said pivot pins, and means fixedly securing said upper limb to said seat.

7. A tip-up seat comprising a pair of spaced standards, a removable seat component positioned between said standards, pivot pins on said standards, members on said seat component adjacent said pivot pins, said members consisting of a resilient strip turned upon itself thus forming upper and lower limbs of unequal lengths with a terminal eye complementary to said pivot pins, said limbs normally abutting at the free ends though separable by said pivot pins under prising engagement, means fixedly securing said upper limb to said seat component, means in said lower limb affording access for and to said fixing means, and an upwardly-extending transverse depression in said lower limb.

In testimony whereof I have signed my name to this specification.

GEORGE HUGH HEDGES.